United States Patent
Pratt et al.

(10) Patent No.: US 6,426,158 B1
(45) Date of Patent: Jul. 30, 2002

(54) METHOD OF DILUTING HYDROGEN GAS EXHAUSTED FROM A FUEL CELL

(75) Inventors: Steven D. Pratt; Sivakumar Muthuswamy, both of Plantation; Ronald J. Kelley, Coral Springs; Robert W. Pennisi, Boca Raton, all of FL (US)

(73) Assignee: Motorola, Inc., Schaumburg, IL (US)

( * ) Notice: Subject to any disclaimer, the term of this patent is extended or adjusted under 35 U.S.C. 154(b) by 76 days.

(21) Appl. No.: 09/620,234

(22) Filed: Jul. 20, 2000

(51) Int. Cl.⁷ .............................................. H01M 8/04
(52) U.S. Cl. .............................. 429/13; 429/22; 429/34
(58) Field of Search .............................. 429/12, 13, 34, 429/22

(56) References Cited

U.S. PATENT DOCUMENTS 5,462,815 A * 10/1995 Horiuchi ........................ 429/13
5,763,113 A * 6/1998 Meltser et al. ................ 429/13
6,103,410 A * 8/2000 Fuller et al. .................. 429/13
6,127,056 A * 10/2000 Wheeler et al. .............. 429/13

FOREIGN PATENT DOCUMENTS

JP 59-149664 * 8/1984 ............ H01M/8/04
JP 7-029586 * 1/1995 ............ H01M/8/04

* cited by examiner

Primary Examiner—Stephen Kalafut
(74) Attorney, Agent, or Firm—Dale W. Dorinski; Randi L. Dulaney

(57) ABSTRACT

A method of diluting reacted fuel gas that is exhausted from a fuel cell. The reacted fuel gas is transferred from the fuel cell (10) into a hydrogen diluting mechanism (16) prior to release into the atmosphere, so that when the reacted fuel gas is subsequently released into the atmosphere, the percentage of hydrogen immediately surrounding the fuel cell does not exceed 4 percent by volume.

8 Claims, 1 Drawing Sheet

METHOD OF DILUTING HYDROGEN GAS EXHAUSTED FROM A FUEL CELL

TECHNICAL FIELD

This invention relates to fuel cells in general and a method of managing the performance of a fuel cell in particular.

BACKGROUND

Fuel cells are electrochemical cells in which a free energy change resulting from an oxidation reaction is converted into electrical energy. A typical fuel cell consists of a fuel electrode (anode) and an oxidant electrode (cathode), separated by an ion-conducting electrolyte. The electrodes are connected electrically to a load (such as an electronic circuit) by an external circuit conductor. In the circuit conductor, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. A fuel (typically hydrogen) capable of chemical oxidation is supplied to the anode and ionizes on a suitable catalyst to produce ions and electrons. Gaseous hydrogen has become the fuel of choice for most applications, because of its high reactivity in the presence of suitable catalysts and because of its high energy density. Similarly, an oxidant (typically air) is supplied to the fuel cell cathode and is catalytically reduced. The most common oxidant is gaseous oxygen, which is readily and economically available from the air for fuel cells used in terrestrial applications. When gaseous hydrogen and oxygen are used as fuel and oxidant, the electrodes are porous to permit the gas-electrolyte junction to be as great as possible. The electrodes must be electronic conductors, and possess the appropriate reactivity to give significant reaction rates. Since the electrolyte is a non-electronic conductor, the electrons flow away from the anode via the external circuit. At the cathode, oxygen gas reacts with the hydrogen ions migrating through the electrolyte and the incoming electrons from the external circuit to produce water as a byproduct. The byproduct water is typically extracted as vapor. The overall reaction that takes place in the fuel cell is the sum of the anode and cathode reactions, with part of the free energy of reaction released directly as electrical energy. The difference between this available free energy and the heat of reaction is produced as heat.

In practice, a number of unit fuel cells are normally stacked or 'ganged' together in series to form a fuel cell assembly by abutting the anode current collector of one cell with the cathode current collector of its nearest neighbor in the stack. The fuel and oxidant are introduced through manifolds to their respective electrodes. In most traditional fuel cell applications the fuel and oxidant supply streams are designed as flow-through systems, however, these systems add a parasitic load to the fuel cell output and thus reduce the net power that can be extracted. In order to reduce the parasitic load, alternate configurations have been created in the prior art where the fuel stream or the oxidant stream or both are "dead-ended". This dead-ended operation creates special problems such as water removal and accumulation of impurities.

In order to use fuel cells for portable applications such as radios or other portable consumer electronics, they need to be small and utilize air as the oxidant. Fuel cells for these applications are typically operated in a "dead-ended" fuel delivery system configuration with the cathode side open to air. A classical problem with air breathing fuel cells is water management. In theory, as the hydrogen in a dead-ended fuel cell is consumed to produce protons and electrons, the gas pressure is reduced and additional hydrogen is automatically introduced to equalize the unbalanced pressure gradient. Since the byproduct water is produced at the cathode (which is exposed to air), it evaporates away during normal operation. However, under heavy load, the evaporation rate lags the rate of formation and water tends to migrate back through the polymer electrolyte to the anode side. Some spots on a fuel cell are cooler than others, and the moisture condenses at these locations into liquid water, flooding the anode and impeding the reaction at the anode. Additionally, other impurities accumulate at the anode, and may poison the anode reaction sites. Inert contaminants also result in loss of performance by lowering the fuel partial pressure. In the prior art (see, for example, U.S. Pat. Nos. 5,366,818 and 4,537,839), these issues are addressed by a brief controlled release of the fuel gas at regular intervals. The purging operation involves controlled venting of a proportion (perhaps from 0.1 to 10%) of gaseous fuel or oxidant through a throttled opening. This purging action removes accumulated impurities, water and fine particulates from the anode side and restores fuel cell performance. Many schemes have also been taught in the prior-art to control the length of, and intervals between, successive purges, such as monitoring the fuel cell power output to provide for the exhaust to be approximately proportional to the amount of hydrogen consumed by the cell. However, release of hydrogen into the open air may create a safety hazard if the concentration of hydrogen is above four (4) percent by volume. It would be an advancement in the art of fuel cell systems to have a dead-ended system that can be purged without constituting a safety hazard.

DETAILED DESCRIPTION OF THE PREFERRED EMBODIMENT

The present invention provides a means of diluting the reacted fuel gas and other contaminants from a fuel cell to safe levels prior to releasing the gas into the open air. Several physical embodiments of the dilution means are described. The reacted fuel gas is transferred from the fuel cell into a hydrogen diluting mechanism by momentarily opening a valve, allowing pressurized hydrogen gas to flow through the fuel cell and sweep the contaminants (along with some unreacted hydrogen) into the hydrogen diluting mechanism prior to release into the atmosphere. When the reacted fuel gas is subsequently released into the atmosphere, the percentage of hydrogen immediately surrounding the fuel cell does not exceed the flammable or explosive concentration of approximately four (4) percent by volume.

Figure 1:
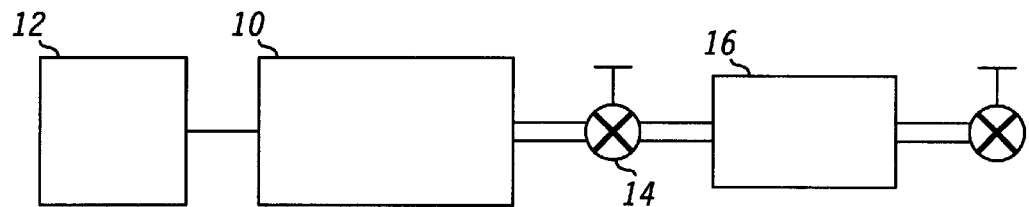
FIG. 1 is a schematic diagram of a fuel cell connected to a hydrogen dilution means in accordance with our invention.

While the specification concludes with claims defining the features of the invention that are regarded as novel, it is believed that the construction, method of operation and advantages of the invention will be better understood from a consideration of the following description in conjunction with the drawing figures, in which like reference numerals are carried forward. Referring now to FIG. 1, a typical fuel cell 10 has two sides, an anode (or fuel) side and a cathode (or air) side. The reader will appreciate that in addition to the anode and cathode, there are also current collectors, catalysts, a polymer electrolyte membrane, gas manifolds, fuel storage reservoir 12, etc. disposed appropriately. Although there are several types of fuels that are used in fuel cells, the most common is gaseous hydrogen. For purposes of our invention, as used herein, the terms fuel, fuel gas, gas, hydrogen gas, and hydrogen are used interchangeably. In practice, the hydrogen gas is admitted from the storage reservoir 12 to the fuel cell 10 and the manifold is pressurized to a desired level. The outlet or vent for the hydrogen gas is normally closed, so the fuel cell is said to be 'dead-ended'. In dead-ended systems the hydrogen gas is not always vented to atmosphere, that is, it does not continuously flow through the gas channels on the anode side, but is only replenished as the equilibrium within the fuel cell is disturbed by consumption of hydrogen. When hydrogen is catalyzed to hydrogen ions that migrate through the polymer electrolyte membrane to produce electricity (and water at the cathode), the hydrogen in the manifold is consumed, thus lowering the pressure and allowing an optional pressure regulator (not shown) to admit additional hydrogen gas to maintain the desired pressurization. During operation of the fuel cell, the internal electrical resistance of the system produces heat. This heat normally evaporates most or all of the byproduct water on or in the membrane electrolyte, creating a very humid environment, and the gaseous $H_2O$ may condense on the cooler portions of the fuel cell. As noted above, since air breathing fuel cells do not utilize forced air flow across the cathode, in some situations (e.g., heavy electrical load) the byproduct water is not removed fast enough and not only causes problems at the cathode catalyst sites, but it begins to migrate back through the polymer electrolyte membrane and to 'flood' the anode side. When this excess water accumulates, it restricts the flow of hydrogen through the system and may cut off the access of 'new' fuel to downstream portions of the fuel cell, adversely affecting the performance of the entire system. In order to maintain optimum performance of dead ended fuel cells, these built up contaminants (water, nitrogen, carbon dioxide and other gases) must be purged from the anode side of the fuel cell. For purposes of clarity and to avoid confusion, we refer to these accumulated gases that are being vented as 'reacted fuel gas'. It should be clear to the reader skilled in the art that reacted fuel gas is mainly hydrogen with trace amounts of water and possibly nitrogen, carbon dioxide and carbon monoxide. Depending on the construction of the fuel cell, other gases might also be found in reacted fuel gas.

Figure 2:
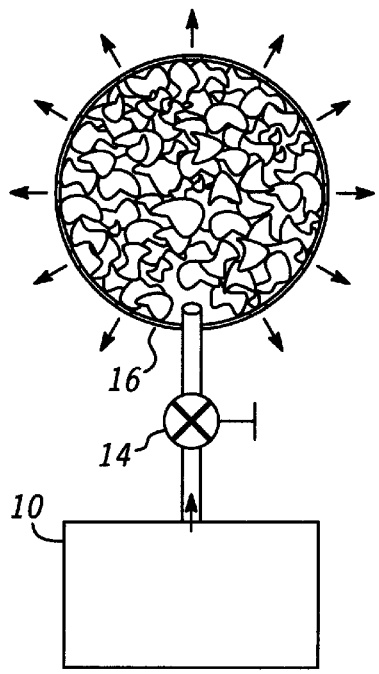
FIG. 2 is a schematic diagram of one embodiment of the hydrogen dilution means.

Purging is accomplished by momentarily opening, then closing, a purge valve 14 located at the gas exit side of the fuel cell. The purge valve can be manually activated or automatically activated based on algorithms that measure fuel consumption, electrical output, or elapsed time. In our invention, the outlet or downstream side of the purge valve 14 is connected to a hydrogen dilution means 16. The hydrogen dilution means 16 can function in one or more of several modes, depending on the embodiment. In the preferred embodiment depicted in FIG. 2, the hydrogen dilution means 16 is a porous frit (glass or metal) that contains massive amounts of interstitial space. When the reacted fuel gas is passed into or onto the frit, it rapidly mixes with air that is trapped in the interstitial spaces. By the time that the reacted fuel gas reaches the exterior periphery of the frit and enters to the open atmosphere surrounding the fuel cell, the concentration of hydrogen is below the explosive level and can be safely vented into the air. The lean flammability limit for hydrogen is 4.1% by volume in air, as noted in the Sourcebook for Hydrogen Applications, by James M. Ohi and Catherine E. Gregoire Padro, National Renewable Energy Laboratory.

Figure 3:
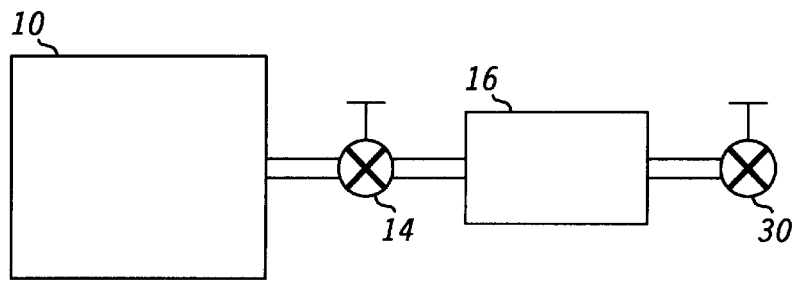
FIG. 3 is a schematic diagram of an alternate embodiment of the hydrogen dilution means.

In an alternate embodiment of our invention depicted in FIG. 3, the hydrogen dilution means 16 consists of an empty holding chamber and an additional valve 30. In a purging operation, the first valve 14 momentarily opens to release some pressurized (typically 1–2 pounds per square inch) reacted fuel gas into the holding chamber, which is initially at atmospheric pressure. The reacted fuel gas is then slowly released or bled into the air by partially opening or pulsing the second valve 30, so that any hydrogen that is released is at a very small amount, thus keeping the concentration of hydrogen in the surrounding air at less than 4.1%.

In still another embodiment, the hydrogen dilution means is a material having a high surface area that is capable of adsorbing hydrogen. As explained above, when the purge valve 14 is opened, the reacted fuel gas flows into the hydrogen dilution means 16, and is adsorbed onto the high surface area medium. One example of a useful medium is a material such as palladium. Eventually, the hydrogen desorbs off the medium at a very slow rate into the surrounding atmosphere, 'freshening' the medium so that additional hydrogen can be adsorbed during the next purge cycle. The rate of desorbtion is equal to or less than the rate of adsorption. Alternatively, a getter material such as PdO can be used. PdO converts $H_2$ into water upon contact. One useful getter is $H_2$-3000 developed by Allied Signal and now made by CSPM (Cookson Semiconductor Packaging, a division of Alpha-Fry Technologies) that is a dessicant that contains PdO. The hydrogen in the reacted fuel gas that is purged from the fuel cell is converted into water and prevented from entering the atmosphere.

In yet another embodiment of the invention, the hydrogen dilution means is a restriction that is vented directly to the atmosphere. The effect of the restriction is to limit or restrict the volume of hydrogen that can be vented in any given time. The restriction is sized so as to limit the mass flow of hydrogen to a low level, thus allowing the vent to be direct to the atmosphere.

In summary, we have created a novel means to keep the concentration of hydrogen in the atmosphere immediately surrounding a fuel cell below the explosive limits, thus creating a safer hydrogen fuel cell for the consumer. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of diluting reacted fuel gas that is exhausted from a fuel cell, comprising passing the reacted fuel gas from the fuel cell through a hydrogen dilution means prior to release into the atmosphere, such that when the reacted fuel gas is subsequently released from the hydrogen dilution means into the atmosphere, the percentage of hydrogen in the atmosphere immediately surrounding the fuel cell is less than 4.1 percent by volume, wherein passing through a hydrogen dilution means comprises passing the reacted fuel gas through a porous frit to mix the reacted fuel gas with air in the frit.

2. A method of diluting reacted fuel gas that is exhausted from a fuel cell, comprising passing the reacted fuel gas from the fuel cell through a hydrogen dilution means prior to release into the atmosphere, such that when the reacted fuel gas is subsequently released from the hydrogen dilution means into the atmosphere, the percentage of hydrogen in the atmosphere immediately surrounding the fuel cell is less than 4.1 percent by volume, wherein passing the reacted fuel gas through a hydrogen dilution means comprises passing the reacted fuel gas through a holding chamber so as to dilute the reacted fuel gas with air.

3. A method of diluting reacted fuel gas that is exhausted from a fuel cell, comprising:

passing the reacted fuel gas from the fuel cell through a hydrogen dilution means prior to release into the atmosphere, such that when the reacted fuel gas is subsequently released from the hydrogen dilution means into the atmosphere, the percentage of hydrogen in the atmosphere immediately surrounding the fuel cell is less than 4.1 percent by volume;

opening a first valve located between the fuel cell and the hydrogen dilution means to move the reacted fuel gas into the hydrogen dilution means;

closing the first valve; and momentarily and repeatedly opening and closing a second valve located at an outlet of the hydrogen dilution means to release the reacted fuel gas into the atmosphere.

4. The method as described in claim 3, wherein the second valve is automatically opened and closed.

5. The method as described in claim 3, wherein the second valve is manually opened and closed.

6. A method of diluting reacted fuel gas that is exhausted from a fuel cell, comprising passing the reacted fuel gas from the fuel cell through a hydrogen dilution means prior to release into the atmosphere, such that when the reacted fuel gas is subsequently released from the hydrogen dilution means into the atmosphere, the percentage of hydrogen in the atmosphere immediately surrounding the fuel cell is less than 4.1 percent by volume, wherein passing reacted fuel gas through a hydrogen dilution means comprises passing the reacted fuel gas through a hydrogen absorption/desorbtion media to absorb hydrogen onto the media, and then subsequently desorbing the absorbed hydrogen from the media at a rate that is equal to or less than the rate of absorption.

7. The method as described in claim 6, wherein the hydrogen absorption/desorbtion media comprises palladium or palladium oxide.

8. A method of diluting reacted fuel gas exhausted from a fuel cell, comprising passing reacted fuel gas from the fuel cell through a porous frit prior to release into the atmosphere, so as to sufficiently mix the reacted fuel gas with air in the frit prior to exhausting the reacted fuel gas and air mixture into the atmosphere.

* * * * *